Dec. 27, 1938. W. S. DAVIS ET AL 2,142,048
METER PROTECTIVE CABINET SEAL
Filed Jan. 10, 1935 4 Sheets-Sheet 1
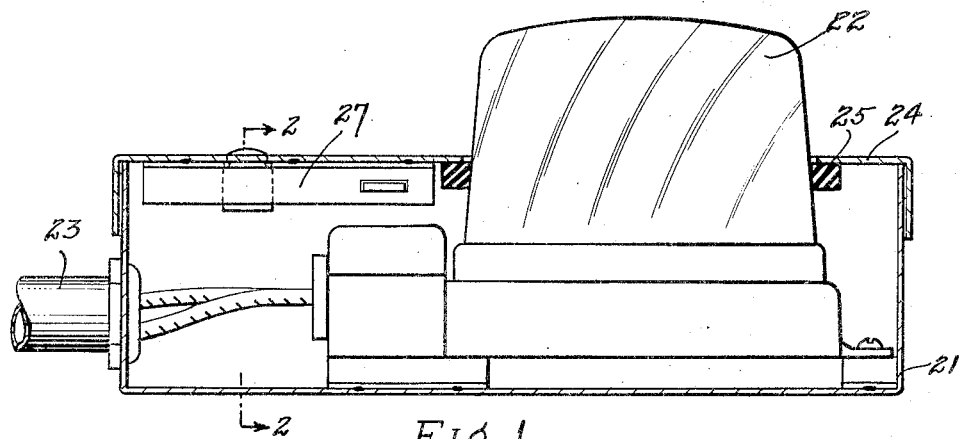
Fig. 1
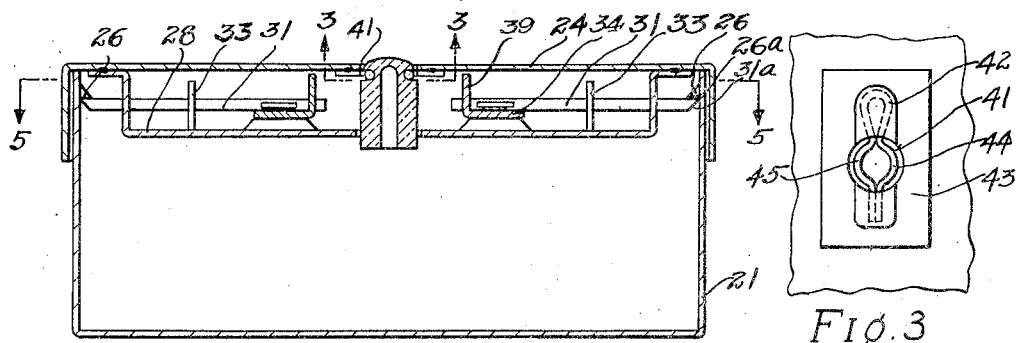
Fig. 2 Fig. 3
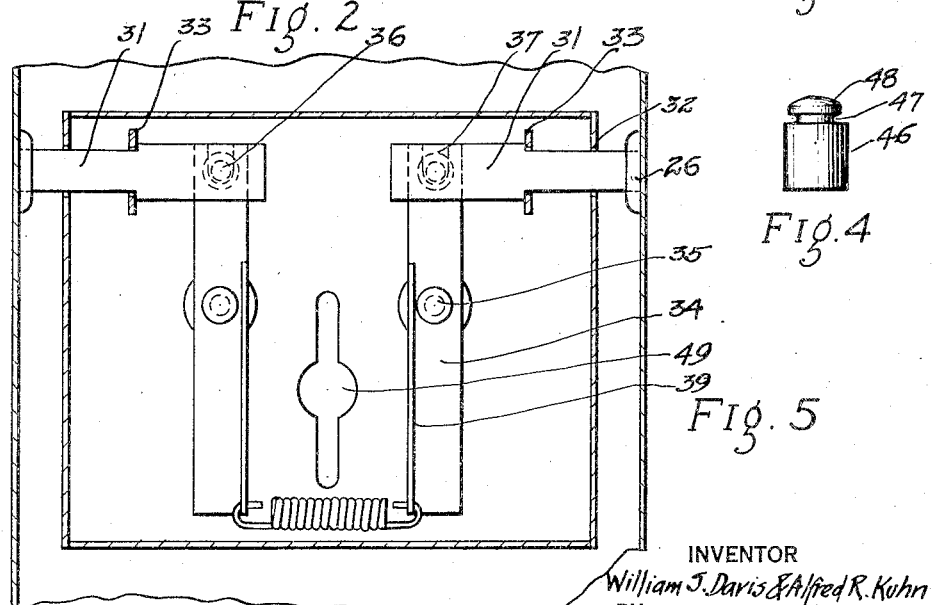
Fig. 4
Fig. 5
INVENTOR
William J. Davis & Alfred R. Kuhn
BY
Jos. H. Nielsen
ATTORNEY Dec. 27, 1938.  W. S. DAVIS ET AL  2,142,048
METER PROTECTIVE CABINET SEAL
Filed Jan. 10, 1935  4 Sheets-Sheet 2
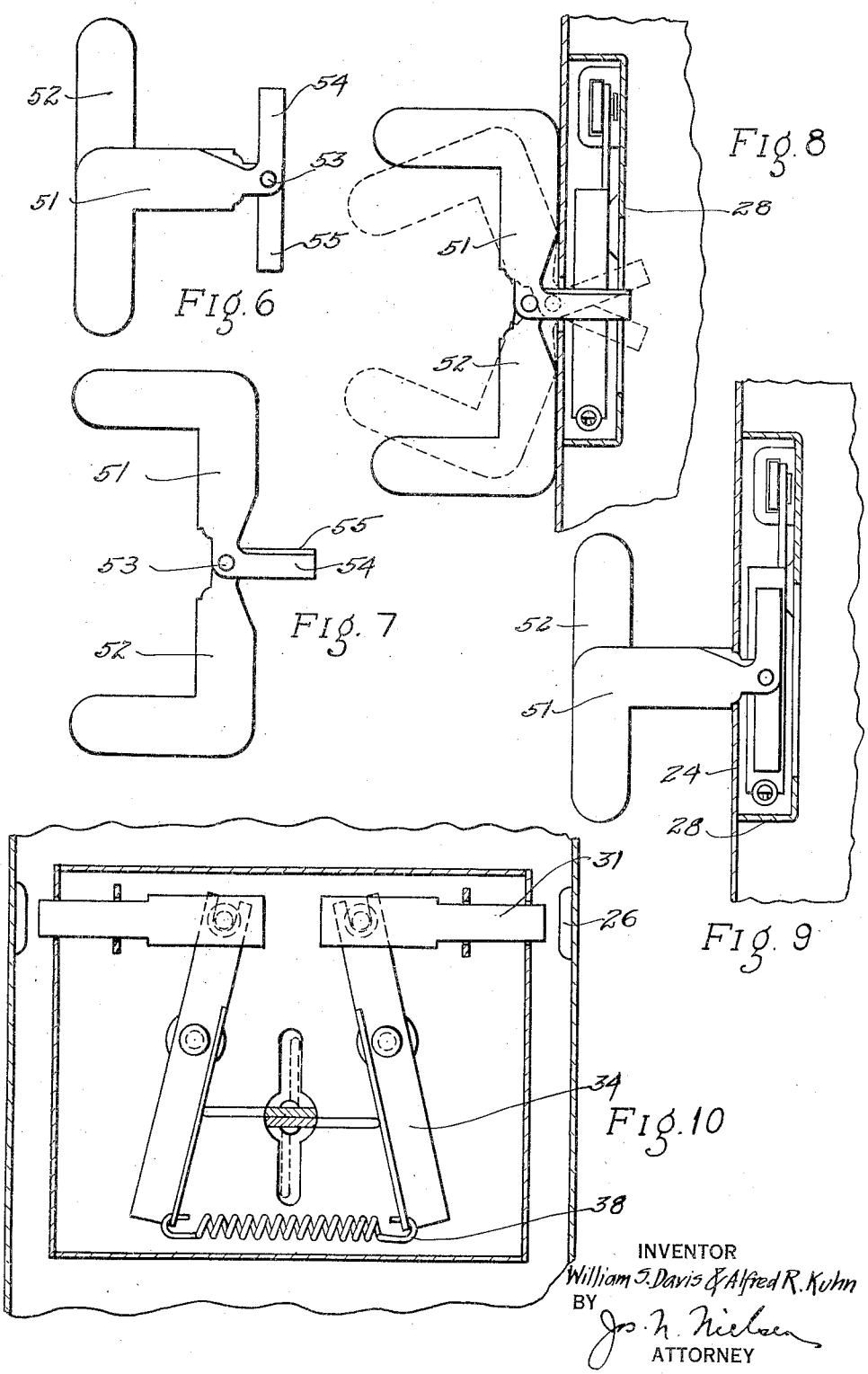
INVENTOR
William S. Davis & Alfred R. Kuhn
BY
ATTORNEY Dec. 27, 1938.    W. S. DAVIS ET AL    2,142,048
METER PROTECTIVE CABINET SEAL
Filed Jan. 10, 1935    4 Sheets-Sheet 3

INVENTOR
William S. Davis & Alfred R. Kuhn
BY
Jos. H. Nielsen
ATTORNEY

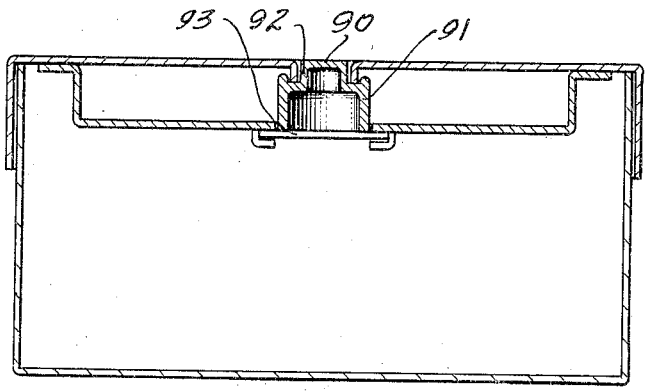
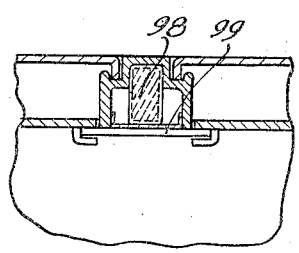
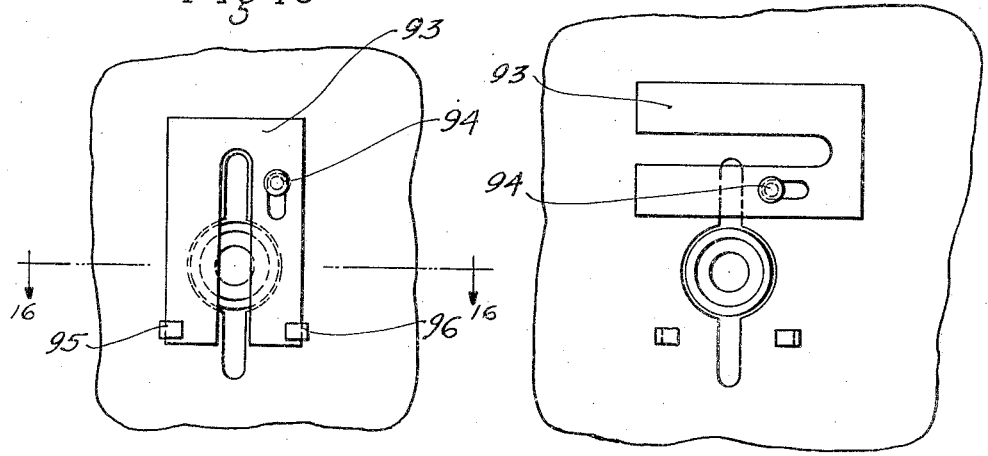
Fig 16  Fig 19  Fig 17  Fig 18

Patented Dec. 27, 1938

2,142,048

UNITED STATES PATENT OFFICE 2,142,048

METER PROTECTIVE CABINET SEAL

William S. Davis, North Hackensack, N. J., and Alfred R. Kuhn, Queens Village, N. Y., assignors to Metropolitan Device Corporation, Brooklyn, N. Y., a corporation of New York Application January 10, 1935, Serial No. 1,228

8 Claims. (Cl. 70—440)

The invention hereinafter described involves a protective cabinet for electric meters. It is intended primarily to prevent theft of unmetered current, but it also serves to protect against fire risk.

In general the cabinet comprises a metal base or casing on which the meter is mounted and to which conduits are attached for the electric supply cables and leading out load cables connected to the meter. A cover for the base prevents access to the meter connections and it is locked to the base.

The invention centers about the cover locking means which is preferably of such a nature as to require a specially constructed key for its operation. In addition it provides a sealing closure piece for the key opening that must be removed before a key can be inserted. Preferably the closure piece is made of breakable material such as porcelain and so designed that it must be broken before access can be had to the locking means.

The invention is illustrated in the accompanying drawings in which

Fig. 1 is a vertical cross section of a cabinet showing the meter in place;

Fig. 2 is a cross section of Fig. 1 on the line 2—2, the meter being omitted;

Fig. 3 is a detail on the line 3—3 of Fig. 2;

Fig. 4 shows in elevation a breakable button to be inserted in the keyhole;

Fig. 5 is a horizontal section on line 5—5 of Fig. 2 showing the locking means;

Fig. 6 is a side elevation of a key for operating the locking means shown in Fig. 5;

Fig. 7 is another view of the key showing the parts thereof in position for insertion through the keyhole;

Fig. 8 shows a portion of the cabinet cover in section and with the key inserted;

Fig. 9 is a view similar to Fig. 8, but showing the elements of the key in operating position;

Fig. 10 is a view similar to Fig. 5 but showing the parts in unlocked position and the key in contact therewith;

Fig. 16 illustrates in vertical cross section another form of sealing button;

Fig. 17 is a fragmentary bottom view of the cover shown in Fig. 16, illustrating a locking bar in closed position;

Fig. 18 is a view similar to Fig. 17 showing the locking bar in open position; and Fig. 19 is a view similar to Fig. 16 but illustrating a capsule of liquid within the button.

Figure 11:
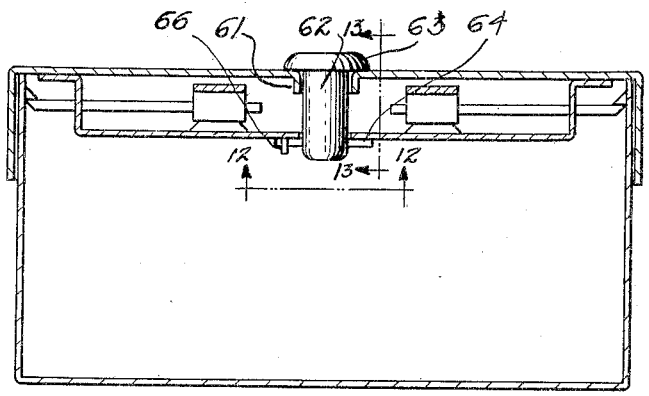
Fig. 11 is a view corresponding to Fig. 2 but illustrating another embodiment of the cover construction.
Figure 12:
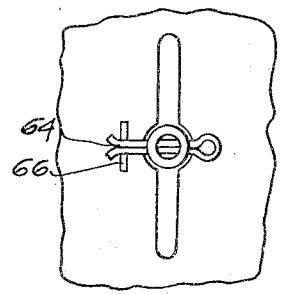
Fig. 12 is a fragmentary cross section on line 12—12 of Fig. 11.
Figure 13:
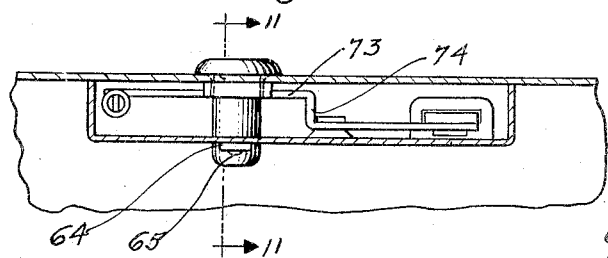
Fig. 13 is a fragmentary view looking in the direction of line 13—13 of Fig. 11.

As shown in Fig. 1 a metal base or casing 21 provides a support for a meter 22. The base is in the form of a box within which the meter is placed, and attached to it are one or more conduits 23 for the supply cables and leading out load cables connected to the meter. A cover 24 is provided for the base, and the cover preferably carries an annular rubber gasket 25 in contact with the meter casing 22. The base has ears 26 projecting interiorly therefrom and the cover supports a locking means 27 for engaging the ears.

In order that the parts of the locking mechanism can be concealed from view when the cover is removed there is preferably provided a shield 28 welded or otherwise secured to the cover plate 24. Within the space thus provided between the shield and the cover plate are mounted the elements forming the locking mechanism. Preferably the locking mechanism is in duplicate and the operation of both is required for unlocking the cover; preferably the cover 24 has a depending flange 24a engaging the sides 21a of the box 21, so that the cover cannot be tilted but must be moved bodily for removal. By this provision any tool that is inserted must operate both simultaneously, thus rendering their operation by any means other than a specially designed key difficult and highly improbable.

The locking mechanism is more fully disclosed in Fig. 5. The mechanism is of the snap lock type and as there shown it consists of a pair of slidable bolts 31 supported on the shield 28 by means of the openings 32 therein and the guides 33 extending from the shield. These bolts are mounted so as to slidably engage the ears 26 formed on the base 21. Lever arms 34 are pivoted at 35 on the shield, and these lever arms at one end slidably engage shouldered rivets 36 on the bolts 31 by means of slots 37. The lever arms at the other end are connected by a tension spring 38 to draw the arms together and cause the bolts 31 to engage the ears 26. Each of the lever arms 34 is formed with a key-engaging surface 39.

A circular keyhole opening 41 is provided in the cover plate 24. A spring 42 as illustrated in Fig. 3 is trapped in register with the keyhole 41 by means of a plate 43. The spring is formed with legs 44 and 45 that are free to separate but bowed for engaging a breakable button 46 (shown in Fig. 4). The button has a contracted section 47 for engagement by the spring legs and forming a weakened section 48. In register with the keyhole there is an opening 49 in the shield. This opening is in the form of an elongated slot in order to receive a key hereinafter described.

The key is illustrated in Fig. 6. The object in view in the key construction is one requiring insertion in one position, and after insertion a relative movement of the key-forming parts before the key can be rotated to operate the locking mechanism. As shown it is made of two flat Z-shaped or angular pieces 51 and 52 pivoted together at an angle of each piece by a rivet 53. With the pieces in the position shown in Fig. 6 the key ends 54 and 55 lie in alignment but extending from each other. In order that the key can be inserted in the keyhole 41 it is necessary that the key ends be in contacting alignment as shown in Fig. 7.

The foregoing constitute the elements of the protective cabinet. In the installation of the cabinet the meter is mounted on the base 21, cables are connected to the meter and the cover 24 is then snapped in place. This is made possible by inclined faces 26a of the ears engaging inclined faces 31a on the bolts and thus retracting the bolts against the action of the spring 36. When the bolts 31 pass the ears 26 the spring 36 then causes the bolts to project into locking contact with the ears.

The cover as applied to the base carries the breakable button 46 previously inserted from within and supported in the keyhole by the spring 42. Accordingly after the cover is in place access to the locking mechanism is normally prevented until the button is broken and thereby released from the spring. The necessity of breaking the button is insured by so forming the shoulder of the weakened portion 48 that when pressure is applied it is forced against the spring legs without any tendency of spreading them apart prior to the breaking of the shoulder.

When it is desired to remove the cover for access to the meter connections it therefore becomes necessary to break out the button. With the button removed the key with its parts in the position illustrated in Fig. 7 can then be inserted through the keyhole as shown in Fig. 8. The key ends 54 and 55 being long enough to extend through the opening 49 in the shield 28, they must be positioned to register with the slotted opening 49 in the shield before the key parts can be swiveled on each other and brought within the space between the cover 24 and the shield 28 as shown in Fig. 9. In this operation the key arms 51 and 52 touch the cover and as they are rotated toward each other in the pivot 53, the pivoted portion enters the keyhole so that the operating ends 54 and 55 are brought within the space. The key can then be turned so that the key ends engage the lever arms 34 to rotate the lever arms on their pivots against the action of the spring 36 and so withdraw the bolts 31 from engagement with the ears 26. The cover being unlocked can be lifted off.

In the modification shown in the Figs. 11 to 14 inclusive, the cover 24 has a modified key opening. In this form there is a depending flange 61 formed about the key opening 41, and a porcelain button 62 with a weakened shoulder 63 is inserted through the key opening from the exterior instead of from the interior as in the preceding embodiment. In place of the spring 42 for engaging the breakable button 62 a sealing pin 64 is provided. This pin in the form of a cotter pin passes through a hole 65 in the sealing button, and the pin engages a projection 66 formed on the shield. By this means the sealing button is held in close contact with the cover and it cannot be rotated. This construction furthermore permits a reduction of the space between the cover 24 and the shield 28 and thereby makes access to the locking mechanism increasingly difficult.

Figure 14:
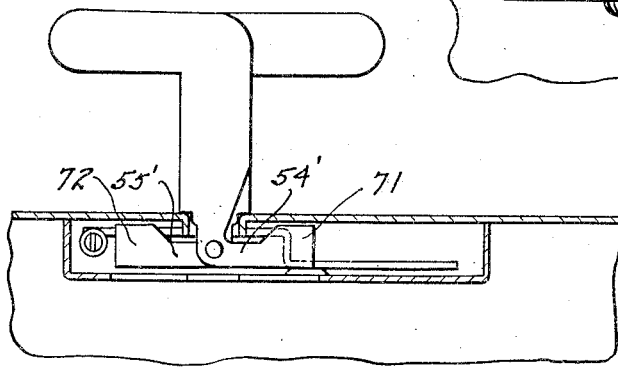
Fig. 14 shows a modified form of a key as inserted in the cover shown in Fig. 11.

A modified configuration of the key for operating the locking mechanism is shown in Fig. 14 and consists in reducing the key ends 54' and 55' adjacent the pivot 53 so as to clear the depending flange 61, and providing enlarged operating ends 71 and 72 so as to operate more closely to the cover. By this construction of the key the lever arms 73 can be bent as at 74 into a plane lying close to the cover 24 and within the area protected by the flange 61. The arms are thereby further protected from possible operation.

In the second embodiment of Figs. 11 to 14 inclusive wherein the sealing button has a shoulder extending over the keyhole it is not possible to insert a wire or the like to contact the locking mechanism without breaking the button; and if the button is broken, it drops within the box or base 21. After the button is broken the locking mechanism is still protected by the depending flange 61 and so requires the insertion of a key of the type shown in Fig. 14 for operating the lever arms.

Figure 15:
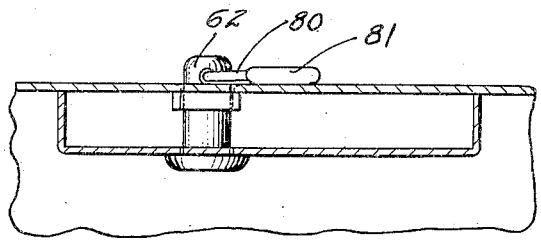
Fig. 15 is a view corresponding to Fig. 11 but showing the button in inverted position.

As illustrated in Fig. 15 the sealing button is reversed from that illustrated in Fig. 11. The button 62 is inserted from the interior of the cover and is held in place by a wire 80 passing through the hole 65. A seal 81 of lead or the like prevents removal of the wire. With this construction the button can be of non-frangible material such as a steel rivet, since breaking the lead seal is a sufficient indication of tampering.

A further modified embodiment of the invention is shown in Figs. 16 to 19 inclusive. The cover and the locking mechanism carried thereby is the same as that illustrated in Figs. 11 and 12; a different form of sealing button and a different means for securing the button in place, however, is disclosed. According to this form the sealing button 90 is in the form of a cup 91, inverted when in place, and larger than the circular key opening. An extruded portion 92 formed on the button fills the key opening and provides a shoulder bearing against the inturned flange 61. This shape of button requires insertion from the interior of the cover, and it is preferably held in place by a locking bar 93. The bar is secured in place by a pivot 94 on which it is slidably mounted so that the bar can be slid into engagement with the supporting ears 95, 96. The bar is provided with a slot 97 to permit operation of the key.

With this form of button it is necessary to break the extruded portion 92 to obtain access to the locking mechanism. The key is then inserted and in this operation or the succeeding step of opening the key the remainder of the button is broken into fragments. When a new button is to be inserted, the locking bar is moved to open position as shown in Fig. 18; after the button is inserted it is then shifted to the locking position and holds the button in place.

In Fig. 19 a similar form of button is illustrated but shown with a capsule of liquid 98 held in the button by a plate 99. When the button is broken the capsule is likewise broken, and the released liquid flows over the cover to leave a tell-tale film.

While the preferred forms of the invention have been illustrated, it is to be understood that other modifications can be made and that accordingly no restriction on the invention is intended except as defined in the following claims.

We claim:

1. Sealing means for a locking mechanism of the key-operated type and provided with a key-hole, said means comprising a breakable button for insertion in the key-hole, and means for securing the button when inserted against removal from the key-hole whereby breakage of the button is required for operating the locking mechanism.

2. Sealing means for a locking mechanism of the key-operated type and provided with a key-hole, said means comprising a button for insertion in the key-hole, said button having a weakened section to render it breakable, and means for securing the button when inserted against removal for the key-hole whereby breakage of the button is required for operating the locking mechanism.

3. Sealing means for a locking mechanism of the key-operated type and provided with a key-hole, said means comprising a button for insertion in the key-hole from the interior of the mechanism, a shoulder on said button engaging the inner side of the key-hole to limit the outward movement of the button, and means for securing the button when inserted against removal whereby breakage of the button is required to operate the locking mechanism and the broken button falls within the mechanism.

4. Sealing means for a locking mechanism of the key-operated type and provided with a key-hole and an internally extending peripheral flange about the key-hole, said means comprising a button provided with a shoulder engaging the flange, and means for maintaining the button in engagement with the flange.

5. Sealing means for a locking mechanism of the key-operated type and provided with a key-hole and an internally extending peripheral flange about the key-hole, said means comprising a button provided with a shoulder engaging the flange, and a bar carried by the mechanism for maintaining the button in engagement with the flange.

6. Sealing means for a locking mechanism of the key-operated type and provided with a key-hole and an internally extending peripheral flange about the key-hole, said means comprising a button provided with a shoulder engaging the flange, said button being hollow to contain a capsule of liquid, and means for maintaining the button in engagement with the flange.

7. Sealing means for a locking mechanism of the key-operated type and provided with a key-hole and an internally extending peripheral flange about the key-hole, said means comprising a button provided with a shoulder having a groove therein for engaging the flange, and means for maintaining the button in engagement with the flange.

8. A seal for a receptacle having a displaceable closure member, comprising a sealing element formed of readily breakable material adapted to close an opening formed in a portion of said receptacle through which access may be had to a securing member for fastening said closure member in the closed position, said sealing element being provided with shoulder means, and means for securing said sealing element in said opening, said means comprising an element secured to a portion of the receptacle adjacent to said opening and having opposed fingers adapted to be displaced by said sealing element when same is being introduced into the sealing position in said opening and movable into contact with said shoulder means of the sealing element when said sealing element has reached the sealing position so as to prevent removal of the sealing element without breaking same.

WILLIAM S. DAVIS.
ALFRED R. KUHN.